United States Patent [19]

Langston et al.

[11] Patent Number: 4,738,785

[45] Date of Patent: Apr. 19, 1988

[54] WASTE TREATMENT PROCESS FOR PRINTING OPERATIONS EMPLOYING WATER DISPERSIBLE INKS

[75] Inventors: Jesse R. Langston, Johnson City; Frank J. Tortorici; Fred D. Barlow, Jr., both of Kingsport all of Tenn.

[73] Assignee: Eastman Kodak Company, Rochester, N.Y.

[21] Appl. No.: 14,561

[22] Filed: Feb. 13, 1987

[51] Int. Cl.$^4$ ................................................ C02F 1/52
[52] U.S. Cl. ..................................... 210/738; 210/917
[58] Field of Search ............... 210/727, 728, 732, 735, 210/917, 702, 738

[56] References Cited

U.S. PATENT DOCUMENTS

| | | | |
|---|---|---|---|
| 3,285,849 | 11/1966 | Watanabe et al. | 210/728 |
| 3,835,045 | 9/1974 | Hussissian | 210/709 |
| 3,868,320 | 2/1975 | Hider et al. | 210/727 |
| 4,704,309 | 11/1987 | Coney et al. | 427/258 |

OTHER PUBLICATIONS

Flick; Ernest W., *Printing Ink Formulations*, Noyles Publications, Park Ridge, N.J., 1985, pp. 43–62.
"Water-Resistant Coatings from Water-Dispersed Polymers", *Research Disclosure*, No. 24,222, Jun. 1984.

*Primary Examiner*—Ivars Cintins
*Attorney, Agent, or Firm*—Thomas R. Savitsky; William P. Heath, Jr.

[57] ABSTRACT

A waste-treatment process for water-based printing operations which employ inks comprising aqueous dispersions of polyester or polyesteramide materials containing water solubilizing sulfo-salt groups, comprising providing in an agitated vessel a substantially homogenous system of water and multi-valent cation, adding the waste aqueous dispersion of polyester or polyesteramide material from the printing operation to the vessel, allowing ion interchange and insolubilization of the material in the water to occur, and physically separating the water from the insolubilized material.

18 Claims, No Drawings

WASTE TREATMENT PROCESS FOR PRINTING OPERATIONS EMPLOYING WATER DISPERSIBLE INKS

This invention concerns a waste treatment process for printing operations employing water-based printing inks.

Many of the present commercial printing operations utilize inks containing water-based latices of polymers such as acrylics, polyvinyl acetate, or butadiene-styrene which form water-resistant films by evaporation of the water and coalescence of the polymer spheres. Also common are inks based on water solutions of ammoniated or aminated carboxyl-containing polymers which form water-resistant films by evaporation of the water and dissipation of the ammonia and amine moieties.

With all of these inks there exist very serious ink waste-disposal problems in that large quantities of water are contaminated with dyes, pigments, polymer and other solids which do not allow simple ground recycling of the water present in the inks. Thus, there is a need to achieve ink disposal from the clean-up operations involved in printing such as from the washing of printing plates, engraved rolls, wiping blades, transfer rolls, metering rolls or the like, wherein the disposal is achieved in a rapid, complete and environmentally acceptable way. Current aqueous inks which must be isolated by tedious procedures and then burned or landfilled present many problems such as storage of high bulk, latent leaching of water-soluble organics and run-off in landfills, and difficult incineration of high water content ink waste.

Water-based ink systems are advantageous however, in many other ways and there is a clear need to develop a disposal system that allows the full potential of water-based inks to be realized.

Recent developments in the printing ink field concern special aqueous inks based on certain water dissipatible polyester and polyesteramide materials containing sulfo-salt groups, which inks can, in large part, supplant present commercial inks and for which the present invention provides an economical, effective waste disposal means.

The present waste ink treatment process overcomes essentially all of the aforesaid waste-disposal problems and is defined in its broad aspects as a waste-treatment process for water-based printing operations which employ inks containing aqueous dispersions of polyester or polyesteramide material containing water solubilizing sulfo-monovalent salt groups, comprising providing in an agitated vessel a substantially homogenous system of water and multivalent cation, adding the waste aqueous dispersion of polyester or polyesteramide material from the printing operation to said system, wherein the atomic ratio of multivalent cation to monovalent salt cation is from about 10,000 to about 0.001, allowing ion interchange and water insolubilization of said material to occur, and physically separating the water from said insolubilized material, In this process the ion exchange typically results in crosslinking between polymer chains which initially effects a somewhat sudden and appreciable increase in viscosity of the aqueous system.

In more preferred and specific embodiments the invention comprises the waste treatment process defined above wherein the printing operation is carried out with an ink comprising an aqueous system of dye and/or pigment and water dispersible polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of about 0.25 gram of polymer in 100 ml. of the solvent, the polymer containing substantially equimolar proportions of acid equivalents (100 mole percent) to hydroxy and amino equivalents (100 mole percent), the polymer comprising the reaction products of (a), (b), (c) and (d) from the following components or ester-forming or esteramide-forming derivatives thereof:

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one sulfonate group attached to aromatic nucleus wherein the functional groups are hydroxy, carboxyl or amino;

(c) at least one difunctional reactant selected from a glycol or a mixture of a glycol and diamine having two —NRH groups, the glycol containing two —CH$_2$—OH groups, of which glycol (A) at least 15 mole percent based on the total mole percent of hydroxy or hydroxy and amino equivalents, is a poly(ethylene glycol) having the structural formula:

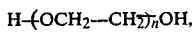

n being an integer of between 2 and about 20, or (B) of which glycol from about 0.1 to less than about 15 mole percent based on the total mole percent of hydroxy or hydroxy and amino equivalents, is a poly(ethylene glycol) having the structural formula:

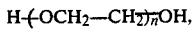

n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —CH$_2$—OH, an aminocarboxylic acid having one —NRH group, an amino-alcohol having one —CR$_2$—OH group and one —NRH group or mixtures thereof, wherein each R or R$_2$ above is a H atom or an alkyl group of 1 to 4 carbon atoms.

Preferred inks for use with the present invention are characterized as follows:

the pigment material is dispersed in the polymeric material in a weight ratio with respect to the total of the polymeric material of from about 1/100 to about 4/1, and the polymeric material is prepared from (a) an acid component (moiety) of from about 75 to about 84 mole % isophthalic acid and conversely from about 25 to about 16 mole % 5-sodiosulfoisophthalic acid, and from a glycol component (moiety) of from about 45 to about 60 mole % diethylene glycol and conversely from about 55 to about 40 mole % 1,4-cyclohexanedimethanol or ethylene glycol;

the inherent viscosity of the polymeric material is from about 0.28 to about 0.35, the said acid component (moiety) comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol;

the pigment is one or a mixture of the following color index materials according to their generic names, specific details of these pigments being given in copending Ser. No. 864,996, the disclosure of which is incorporated herein by reference: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; or C.I. Pigment Blue 15:3;

the polymeric material is dispersed in water and comprises from about 1% to about 50% by weight of the total aqueous dispersion, preferably from about 10% to about 40% by weight of the total aqueous dispersion; and the aqueous dispersion is coated or printed onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide or polystyrene.

Since in a typical clean-up situation, the total volume of principal ink solids, polymer and colorant, is probably less than about 10% of the total weight of the clean-up wash generated, there is an obvious advantage for a system that can remove the solids for safe disposal and allow the bulk of the water to go back to the environment.

By means of the present treatment process the ink solids can be brought rapidly and completely out of dispersion. The polymer precipitate carries with it essentially all of the water insoluble components including colorants, both pigments and dyes, that are dispersed, sequestered or entrained in the polymer.

Essentially all multivalent cations will work but there are a number of preferred requirements for the cation-/anion material: (a) it must be non-toxic to humans and to the environment in general; (b) it must be available in a water-soluble form that is stable in water; (c) it must be non-radioactive; (d) it must be readily available; and (e) it must be non-corrosive to commercially used metals, alloys, and plastics. Specific examples of useful compounds include, but are not limited to, aluminum sulfate, calcium chloride, magnesium sulfate, zinc chloride, and the like, with aluminum sulfate being preferred. In general, cations of elements in groups IIA, IIIB, IVB, VB, VIB, VIIB, VIII, IB, IIB, and IIIA of the Periodic Table of Elements are suitable if they meet the above requirements, (a) through (e). Such insolubilizing cations are disclosed in Defensive Publication T949,001 published Aug. 3, 1976. Also, useful are the polyvalent cationic organic species such as quaternized polyamine materials typically by the quaternized benzothiazole basic dye "Thioflavin T" (C.I. 49005).

It is noted that the monovalent sulfonate cation of the above water-dispersible polymer can be any of $H^+$, $Na^+$, $K^+$, $Li^+$, or the cations of primary, secondary or tertiary aliphatic or arylamines. The water-dispersible printing inks may be prepared, for example, as disclosed in U.S. Pat. No. 4,148,779 incorporated herein by reference. The polymers are prepared as disclosed in U.S. Pat. Nos. 3,734,874; 3,779,993; and 4,233,196, the disclosures of which are incorporated herein by reference. These polymers are formulated, for example, into water-based flexographic, gravure, and screen-process printing inks, which incidentally, upon drying in the press maintain a sufficient degree of water dispersibility to allow rapid rewetting of the rolls and plates on restarting of the press and to allow easy clean-up of the press with water, especially soapy water.

In the present process, the required time of contact in the vessel can be very short, on the order of one to several seconds, depending on the concentration of multivalent cations present. In this regard it is preferred that the aforementioned atomic ratio be in the range of from about 0.01 to about 0.5. Although a wide range of dilutions of the precipitating system is operable, e.g., total water/total polymer, by weight of from about 5 to about 1000, it is preferred that the weight ratio of total water to total polymer in the system during ion exchange be from about 20 to about 80.

The above defined polymers are excellent film formers for water-based printing inks, forming stable dispersions in water and producing tough, flexible films on drying. The polymers in dispersion form may be plasticized if necessary with certain water immiscible phthalate esters to high degrees of flexibility. The inks dry rapidly upon printing but have long "open" times in a container open to the atmosphere, such as a printing press fountain. The inks wet surfaces well and have excellent adhesion to a large variety of substrates including plastic films, aluminum foil and paper. Both the 100% solid polymers and the corresponding aqueous dispersion may be pigmented by conventional techniques, and high gloss prints may be obtained therefrom.

In preparing the present inks, the following procedure is preferred for dispersing the polymers in water: The water should be preheated to about 180° F. to about 200° F. and the polymer pellets added rapidly to the vortex under high shear stirring. A Cowles Dissolver, Waring Blender, or similar equipment may be used. Once the water is heated to the desired temperature, additional heat input is not required. Depending upon the volume prepared, dispersion of the pellets should be complete within 15 to 30 minutes stirring. Continued agitation with cooling may be desirable to prevent thickening at the surface due to water evaporation. Viscosities of these initial dispersions remain low up to polymer levels of 25-30% and viscosities increase sharply above these levels. These viscosities will be influenced by the degree of polymer dispersion obtained which is affected by the dispersing temperature, shear, and time. The polymer content typically ranges from about 15% to about 50% by weight of the dispersion with the preferred for most applications being from about 26% to about 38%. The polymer content of the finished ink typically ranges from about 15% to about 40% by weight of the ink, with from about 17% to about 25% being preferred.

The finished ink may be prepared as follows: The pigment is added to the above initial polymer dispersions, and at a properly adjusted viscosity, dispersed thereinto with ball mill, sand mill, high-shear fluid flow mill, Cowles Dissolver, Katy Mill or the like. The pigments also may be dispersed directly in the polymer by milling on a heated two-roll mill at about 220°–360° F. and using processing aids as desired, such as solvents or plasticizers. The viscosity and printing characteristics of the ink may be modified further by addition of water, solvents, plasticizers, sequestered wax, surfactants and the like to suit the particular printing needs.

The present waste treatment process is not limited to the separation of any type of dye, pigment, filler, or the like, all of which are hereinafter included in the term "pigment," and can accommodate any such pigment which can be dispersed, milled, mixed, blended or dissolved in any manner in either the polymer, the water or the aqueous polymer system. Useful categories of pigments include extenders, inorganic color, organic color, carbon black, metallic, and disperse, acid and basic dyes. Typical pigments are clays, $TiO_2$, phthalocyanine blue, quinacrodones, carbonates, silicates, oxides, Lithol Red, Rubine Red, BON Maroon, Diarylide Yellows, channel black, furnace black, bone black, aluminum flake and bronze flake.

The following is an example of the use of the present treatment process for the clean-up waste from a Webtron Flexographic Press.

The ink is prepared as above described comprising the following: 100 g. of polymer having an I.V. of about 0.35 and a No. 3 Zahn Cup viscosity of 25 seconds prepared from 88 moles of isophthalic acid, 12 moles of 5-sodiosulfoisophthalic acid, 8 moles of ethylene glycol, and 92 moles of diethylene glycol; 100 g. of Diarylide Yellow pigment; 240 g. of water; and 60 g. of ethanol.

This ink is placed in the ink well of the first station of the press, a roll of clay filled paper is mounted (threaded) in the press, and the press started and set for about 300 ft./min. The ink is picked up on an Anilox roll, transferred thereby to a rubber printing plate mounted on a roll, and impressed thereby onto the paper web. The printed paper proceeds through a drying oven at 120° F. for about 1 second, and the paper then rolled up on a take-up roll. The clean-up with soapy water or alcohol/water mixture of the rolls, plate and other press parts is accomplished as follows. A resin-lined steel 55 gallon drum is fitted with an electrically driven stirrer clamped to the sides of the drum. To this drum are added 10 gallons of water which preferably is of a quality that can be sent to the local drain. To this water is added one pound of aluminum sulfate and the mixture is stirred until complete solution is achieved (usually less than 10 minutes). With continued agitation, the wash-up from the ink fountains, press clean-up, wells and other ink-bearing waters are added to the drum to bring the total water in the system to about 400 lbs. with the total polymer therein being about 6 lbs. The mixture in the vessel remains active in precipitating polymer as long as excess cations remain in the water. In this regard it is noted that theoretically, one pound of aluminum sulfate can insolubilize several thousand gallons of such waste ink, however, a relatively large excess of aluminum sulfate is preferred. After the ion exchange is complete, the drum contents comprise heavy solids suspended in the agitated clear water. The solids are removed from the clear water by any one of a number of techniques. One such technique is to siphon the suspension into a filter such as a cheesecloth sock or the like attached to the outside of the siphon to thereby collect the solids and allow the clear water to go to the drain or ground. The solids collected in this way can further be dewatered as by applying pressure to the sock. The dewatered contents of the filter are then easily burned or landfilled. Inks of different colors can be mixed and the cleanup handled in the same way. Likewise, clean-up waters from a variety of different presses and/or fountains can be mixed in the vessel with equally good results.

It is noted that for particularly large or multi-line printing operations the treatment process can be carried out in a continuous manner wherein the atomic ratio of multivalent cation to monovalent salt cation of the polymer is maintained within the stated range by the addition of multivalent cation to the system as needed. For such a continuous process, continually operating filtering means are commercially available such as vacuum operated, scraped drum filters.

The invention has been described in detail with particular reference to preferred embodiments thereof, but it will be understood that variations and modifications can be effected within the spirit and scope of the invention.

We claim:

1. A waste treatment process for water-based printing operations comprising the steps of:
   (A) contacting under agitation, in a vessel, the following:
      (a) a substantially homogenous system of water and multivalent cations, and
      (b) an aqueous waste ink dispersion from a water-based printing operation, said aqueous waste ink dispersion containing: a polymer selected from polyester or polyesteramide materials having water solubilizing sulfo-salt groups wherein the cations of said sulfo-salt groups are monovalent cations,
   wherein the atomic ratio of said multivalent cations to said monovalent cations is from about 10,000 to about 0.001, said contacting occurring for a sufficient contacting period such that an insolubilized material is formed, and
   (B) physically separating the water from said insolubilized material.

2. The treatment process of claim 1 wherein said aqueous waste ink dispersion comprises an aqueous system of dye, pigment or mixtures thereof and water-dispersible polymer having carbonyloxy linking groups in the linear molecular structure wherein up to 80% of the linking groups are carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml. of the solvent, the polymer containing substantially equimolar proportions of acid equivalents (100 mole percent) to hydroxy and amino equivalents (100 mole percent), the polymer comprising the reaction product of (a), (b), (c) and (d) from the following components or ester-forming or esteramide-forming derivatives thereof:
   (a) at least one difunctional dicarboxylic acid;
   (b) from about 4 to about 25 mole percent, based on a total of all acid, hydroxyl and amino equivalents being equal to 200 mole percent, of at least one difunctional sulfomonomer containing at least one sulfonate group attached to aromatic nucleus wherein the functional groups are hydroxy, carboxyl or amino;

(c) at least one difunctional reactant selected from a glycol or a mixture of a glycol and diamine having two —NRH groups, the glycol containing two —CH₂—OH groups, of which glycol (A) at least 15 mole percent based on the total mole percent of hydroxy or hydroxy and amino equivalents, is a poly(ethylene glycol) having the structural formula:

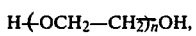

n being an integer of between 2 and about 20, or (B) of which glycol from about 0.1 to less than about 15 mole percent based on the total mole percent of hydroxy or hydroxy and amino equivalents, is a poly(ethylene glycol) having the structural formula:

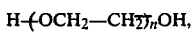

n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —CH₂—OH, an aminocarboxylic acid having one —NRH group, an amino-alcohol having one —CR₂—OH group and one —NRH group or mixtures thereof, wherein each R or R₂ above is a H atom or an alkyl group of 1 to 4 carbon atoms.

3. The process of claim 2 wherein said difunctional sulfomonomer (b) is a dicarboxylic acid and constitutes about 8 mole percent to about 50 mole percent based on the sum of all acid equivalents.

4. The process of claim 2 wherein said polymer is comprised of 80-92 mole percent of an isophthalic acid residue, 8-20 mole % of a 5-sodiosulfoisophthalic acid residue and at least about 50 mole % of a diethylene glycol residue.

5. The process of claim 2 wherein said polymer is comprised of 80-92 mole % of an isophthalic acid residue, 8-20 mole % of a 5-sodiosulfoisophthalic acid residue, 10-80 mole % of a diethylene glycol residue, 20-40 mole % of a 1,4-cyclohexanedimethanol residue, and 0-50 mole % of an ethylene glycol residue.

6. The process of claim 1 wherein the multivalent cation is selected from Al, Ni, Ca, Cd, Cu, and Fe, the atomic ratio thereof to monovalent cation is from about 100 to about 2.0, and the weight ratio of total water to total polymer in the system is from about 20 to about 80.

7. The process of claim 6 wherein said polymer is comprised of 80-92 mole percent of an isophthalic acid residue, 8-20 mole % of a 5-sodiosulfoisophthalic acid residue and at least about 50 mole % of a diethylene glycol residue.

8. The process of claim 6 wherein said polymer is comprised of 80-92 mole % of an isophthalic acid residue, 8-20 mole % of a 5-sodiosulfoisophthalic acid residue, 10-80 mole % of a diethylene glycol residue, 20-40 mole % of a 1,4-cyclohexanedimethanol residue, and 0-50 mole % of an ethylene glycol residue.

9. The process of claim 1 wherein the source of the multivalent cation is aluminum sulfate.

10. The process of claim 9 wherein said polymer is comprised of 80-92 mole percent of an isophthalic acid residue, 8-20 mole % of a 5-sodiosulfoisophthalic acid residue and at least about 50 mole % of a diethylene glycol residue.

11. The process of claim 9 wherein said polymer is comprised of 80-92 mole % of an isophthalic acid residue, 8-20 mole % of a 5-sodiosulfoisophthalic acid residue, 10-80 mole % of a diethylene glycol residue, 20-40 mole % of a 1,4-cyclohexanedimethanol residue, and 0-50 mole % of an ethylene glycol residue.

12. The process of claim 1 wherein said contacting period is less than about one minute.

13. The process of claim 12 wherein said polymer is comprised of 80-92 mole percent of an isophthalic acid residue, 8-20 mole % of a 5-sodiosulfoisophthalic acid residue and at least about 50 mole % of a diethylene glycol residue.

14. The process of claim 12 wherein said polymer is comprised of 80-92 mole % of an isophthalic acid residue, 8-20 mole % of a 5-sodiosulfoisophthalic acid residue, 10-80 mole % of a diethylene glycol residue, 20-40 mole % of a 1,4-cyclohexanedimethanol residue, and 0-50 mole % of an ethylene glycol residue.

15. The process of claim 1 wherein said polymer is a linear copolyester the acid component of which is comprised of from about 8 mole % to about 45 mole % of at least one dicarboxylic acid containing a —SO₃M group attached to an aromatic nucleus of from about 6 to about 14 carbons, wherein M is selected from H⁺, Na⁺, K⁺, Li⁺, NH₄⁺, and the cations of primary, secondary and tertiary aliphatic and aryl amines, the remainder being at least one dicarboxylic acid selected from aliphatic of from about 6 to about 30 carbons, cycloaliphatic of from about 4 to about 12 carbons, and aromatic of from about 6 to about 14 carbons, and the diol component of which comprises at least about 20 mole percent of a poly(ethylene glycol) having the formula

wherein n is an integer of from 2 to about 14, the remainder being at least one diol of from about 2 to about 28 carbons.

16. The process of claim 1 wherein said polymer is comprised of 80-92 mole percent of an isophthalic acid residue, 8-20 mole % of a 5-sodiosulfoisophthalic acid residue and at least about 50 mole % of a diethylene glycol residue.

17. The process of claim 1 wherein said polymer is comprised of 80-92 mole % of an isophthalic acid residue, 8-20 mole % of a 5-sodiosulfoisophthalic acid residue, 10-80 mole % of a diethylene glycol residue, 20-40 mole % of a 1,4-cyclohexanedimethanol residue, and 0-50 mole % of an ethylene glycol residue.

18. The process of claim 1 carried out in a continuous manner wherein said atomic ratio of multivalent cations to monovalent cations is maintained within said range by the addition of said multivalent cations to said vessel.

* * * * *